Aug. 15, 1967     A. KESSLER     3,336,403
HYDROBROMINATION PROCESS
Filed Dec. 26, 1963
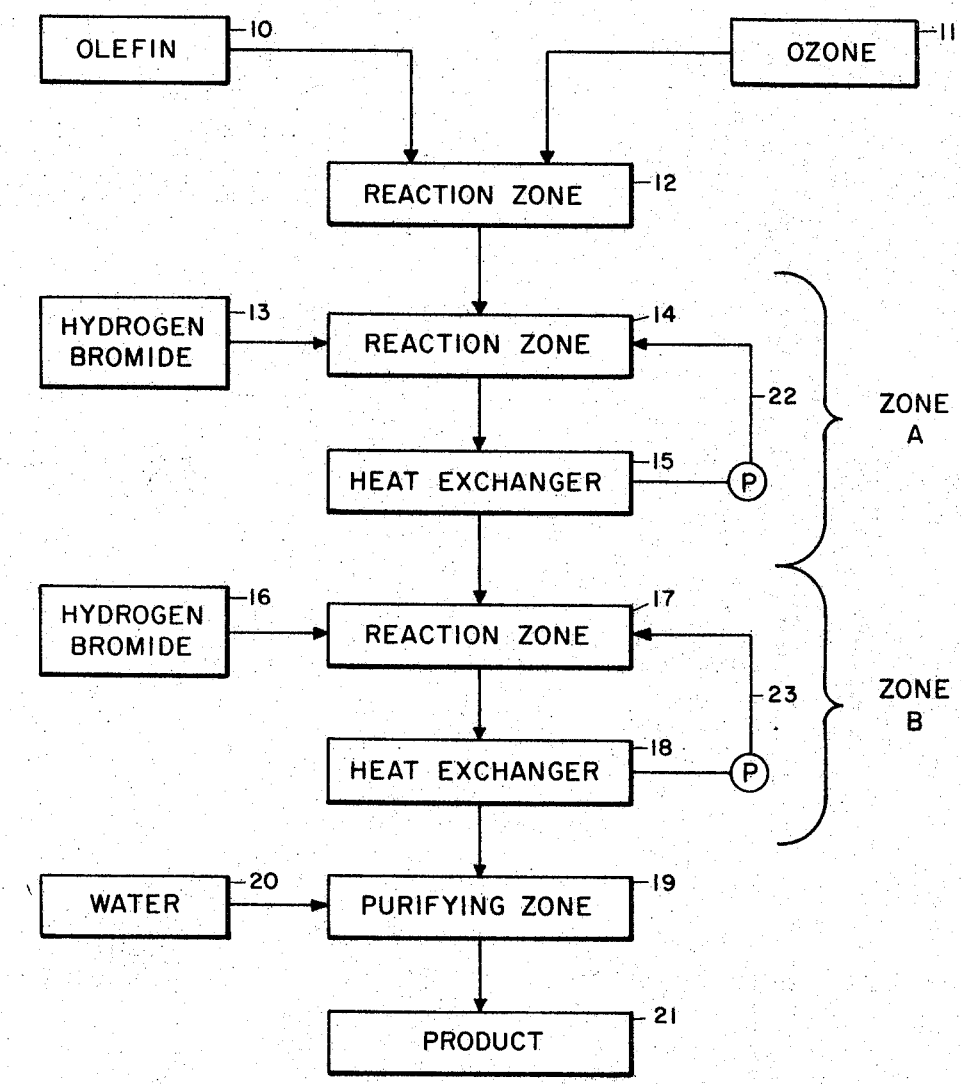
Adriaan Kessler
INVENTOR.
BY Richard C. Witte
Julius P. Filcik
ATTORNEYS

United States Patent Office 3,336,403
Patented Aug. 15, 1967

3,336,403
HYDROBROMINATION PROCESS
Adriaan Kessler, Cincinnati, Ohio, assignor to The Procter & Gamble Company, Cincinnati, Ohio, a corporation of Ohio
Filed Dec. 26, 1963, Ser. No. 333,575
8 Claims. (Cl. 260—663)

This invention relates to the preparation of alkyl monobromides by the anti-Markownikoff, or free radical addition of hydrogen bromide to olefinic hydrocarbons. More especially, the invention provides a multi-step hydrobromination process comprising a reaction between an alpha olefin and a gaseous hydrogen bromide in the presence of an oxonide compound which promotes or catalyzes the reaction.

Alkyl bromides have assumed considerable importance in recent years as starting materials for the production of a great many types of organic derivatives. For instance, alkyl bromides are useful intermediates in the preparation of fatty alcohols by hydrolyzing the alkyl bromide with lye. Also, alkyl bromides can be reacted with sodium cyanide to produce a nitrile which can be reacted with sulfuric acid to form an iminosulfate which in turn can be hydrolyzed to produce a fatty amide type of surfactant. Various amine oxides useful as detergent compounds are prepared by oxidizing the reaction product formed by reacting alkyl bromides with a secondary amine such as dimethylamine.

The addition of hydrogen halides to unsaturated hydrocarbons is a well known reaction. Markownikoff stated in 1870 that if an unsymmetrical olefin is treated with hydrogen halide, the addition will occur at the carbon-carbon double bond, and that the hydrogen will attach itself to the carbon atom bearing the greater number of hydrogen atoms and the halide will attach itself to the carbon atom bearing the least number of hydrogen atoms. This mode of addition is termed the "normal" or Markownikoff addition to distinguish it from abnormal, anti-Markownikoff or free radical addition wherein the halide atom will attach to the carbon atom bearing the greater number of hydrogen atoms. The present invention pertains to the latter type of hydrobromination process employing a free radical system.

Several methods are known for controlling the direction by which a hydrohalogenation reaction proceeds. For instance, it has been proposed to effect an anti-Markownikoff hydrohalogenation reaction in the presence of various free radical promoters such as peroxides, e.g., hydrogen peroxide, acetyl peroxide, ascaridole, and the like, as well as compounds which tend to form peroxides when contacted with unsaturated compounds such as oxygen, air or ozone. It is also known that ultra-violet radiations can be used to promote or catalyze the abnormal addition of hydrogen bromide, for example, to unsaturated organic compounds.

The use of peroxides to promote anti-Markownikoff addition in many cases results in a relatively slow and unselective reaction. Moreover, peroxides are known polymerization catalysts for a large number of unsaturated hydrocarbons and, therefore, must be used with considerable care. The use of ultraviolet light to promote the "abnormal" addition also has several serious drawbacks in that it requires the use of expensive quartz equipment and is extremely sensitive to film formation on the quartz window. The use of oxygen itself to promote anti-Markownikoff addition also results in a comparatively slow reaction rate.

Accordingly, one general object of this invention is to provide an improved process for the preparation of alkyl bromide products by the addition of hydrogen bromide to unsaturated aliphatic hydrocarbons which process is free of the disadvantages associated with prior art methods.

Another object is to provide a rapid and continuous multi-step hydrobromination process for the preparation of alkyl bromides and especially primary alkyl bromides of improved quality especially as regards color and stability characteristics.

A further object is the provision of a rapid and continuous hydrobromination process for preparing alkyl bromides of improved color and stability by the free radical addition to hydrogen bromide to alpha olefins having from about 10 to about 20 carbon atoms and including a small amount of vinylidene branched olefins comprising the steps of (a) reacting in a first reaction zone said alpha olefins with less than a stoichiometric amount of gaseous anhydrous hydrogen bromide in the presence of from about .005 to 5.0 mole percent of an ozonide free radical initiator to cause partial conversion of the alpha olefins to alkyl bromides, and (b) reacting in a subsequent reaction zone said partially converted reaction product with additional excess gaseous anhydrous hydrogen bromide to complete the conversion reaction.

These and other objects and advantages of the instant invention will become apparent from the following description and explanation of the invention.

The attached drawing is a schematic flow sheet depicting the several steps of the process including the reaction zone for contacting the ozone with the raw material alpha olefin being hydrobrominated: a first dominant bath recycle system (reaction zone A) in which gaseous anhydrous hydrogen bromide is mixed with the olefin-ozone mixture and a portion of this reaction mixture is recycled through a heat exchanger: a second dominant bath recycle system (reatcion zone B) comprising an additional hydrogen bromide source, a heat exchanger and recycle means; and a purification zone for the alkyl bromides followed by recovery of the desired final product.

It has been discovered that an alkyl bromide reaction product of improved quality can be prepared by conducting an anti-Markownikoff hydrobromination reaction in a plurality of steps. An overall picture of the present invention can be obtained by briefly discussing the flow sheet of the attached drawing.

The alpha olefin raw material as hereinafter described, 10, which is to be hydrobrominated is contacted continuously with a predetermined amount of ozone, 11, in a reaction zone, 12. This results in the formation of a reaction mixture containing olefin raw material and a small amount of an ozonide corresponding to the starting olefin raw material. This reaction mixture passes to a reaction zone, 14, where gaseous anhydrous hydrogen bromide, 13, is added in an amount which is less than the stoichiometric quantity required to convert all of the alpha olefin starting material. The partially converted alkyl bromide reaction solution passes to a heat exchanger, 15, and from the heat exchanger the mixture is split into two fractions, a first fraction which is recirculated, 22, through the reaction zone 14, along with the olefin starting material and the ozonide, and a second fraction which passes to a second reaction zone, 17. To this second fraction comprising alkyl bromides, unreacted alpha olefins, and a small amount of an ozonide, there is introduced an additional amount of gaseous anhydrous hydrogen bromide, 16, which is adequate to complete the conversion of the alpha olefins to alkyl bromides. The reaction mixture upon leaving the reaction zone, 17, passes through heat exchanger, 18, where the reaction stream is divided into two fractions, one to be recycled 23, to reaction zone, 17, and the second to pass through a purifying zone, 19.

Water, 20, is added into the purifying zone, 19, to remove any dissolved hydrogen bromide. The purified alkyl bromide reaction product, 21, which is predominantly primary bromide can be collected and stored or used directly from this stage.

The flow diagram while being illustrative does properly depict the present invention as being a multi-step process of hydrobrominating alpha olefins comprising a series of dominant bath recycle type reaction steps. For purposes of this invention a dominant bath recycle system consists of a reaction vessel, a heat exchanger, a pump and a recirculation loop. While two such units or systems are illustrated in the drawing, additional units can be added in sequence if desired. Moreover, the second or final reaction zone when more than two are used, can be an ordinary backmix type finishing reactor with adequate mixing being accomplished by means other than a dominant bath recycle system such as conventional stirrer means.

While other reaction units designed to efficiently promote heat and mass transfer can be usefully employed in practicing the process of this invention, dominant bath recycle systems, because they combine compactness with adequate heat removal capacity are the most suitable type for the present hydrobromination reaction. Since the basic olefin-hydrogen bromide reaction is very exothermic, adequate heat removal capacity is a paramount consideration and the problem is handled exceptionally well by a dominant bath recycle system.

The present multi-step process is to be contrasted with a usual single stage process wherein an olefinic starting material containing a small amount of vinylidene branched olefins is reacted with a stoichiometric quantity of hydrogen bromide in the presence of a free radical initiator. The alkyl bromide reaction product obtained from a hydrobromination reaction which is completed in a single step under ordinary conditions is of an inferior quality. For example such a reaction product generally ranges in color from light brown to dark brown or even black. Such color impurities can rule out the use of such alkyl bromides as intermediates for producing detergent surfactants, for example, or they can entail complex and expensive purification processes. It frequently occurs that known discoloring methods are unsuccessful in adequately purifying the final product.

The most important advantage of the present multi-step hydrobromination reaction is the improved stability of the alkyl bromide reaction product. An alkyl bromide reaction product produced by a hydrobromination reaction employing alpha olefins containing a small amount of vinylidene branched olefins, completed in a single step under ordinary conditions decomposes much more readily than an alkyl bromide reaction product prepared according to the present invention. The stability advantage of the products prepared according to this invention becomes apparent when a comparison is made between sample reaction products when employed as intermediates in organic reactions. For instance, amination reactions involving alkyl bromides and dialkyl amines, e.g., dimethyl amine, require temperatures in excess of 300° F. as well as relatively long reaction times. An alkyl bromide reaction product prepared according to the process of this invention is able to withstand such vigorous reaction conditions without the regeneration of excessive amounts of olefinic compounds including both alpha olefins and internal olefins. High temperatures also are involved in other reactions using alkyl bromides as reactants such as nitrilation to alkyl nitriles, requiring about one hour at 275° F., hydrolysis to alcohols, requiring about one-half hour at 350° F. Examples are presented hereinafter which demonstrate the improved stability characteristics of the alkyl bromides prepared by the present invention. Excellent results are obtained, by the present process for instance, when so-called cracked wax alpha olefins are used. The real advantages become apparent and the present invention is best applied to ethylene build-up alpha olefins containing from about 10 to about 20 carbon atoms. While it will be understood that the source of the alpha olefins is not critical, it also should be understood that alpha olefins which contain a small amount of vinylidene branching represent the preferred raw material for hydrobromination by the present invention. Examples of suitable alpha olefin compounds for employment in this invention are 1-decene, 1-dodecene, 1-tetradecene, 1-hexadecene, 1-octadecene, and 1-eicosane. Mixtures of such olefins can be used in the present process as well as pure olefin compounds.

Ethylene build-up alpha olefins are well known. These compounds are typically made by passing ethylene into a trialkylaluminum at about 212° F. to about 392° F. and at atmospheric or higher pressures for a period of from about several minutes to an hour or more. Alpha olefins of various and predetermined chain lengths are thus obtained. In preparing ethylene build-up olefins by this manner a small but substantial amount of vinylidene branched-type olefins is also obtained. The preferred starting olefinic reactants for the present process contain from about one to about ten percent vinylidene branched olefins. The reasons for the effect which the vinylidene branching has upon the behavior of the alpha olefins is not clearly understood at this time.

An essential characteristic of the hydrogen bromide gas employed in the practice in this invention is that it must be anhydrous. The presence of moisture anywhere in the system is deleterious and should be avoided. The source of the hydrogen bromide raw material is not material to the broad application of this invention.

It is fundamental to the present invention that an ozonide free radical initiator be present during the addition of the hydrogen bromide to the raw material olefin being treated. Ozone for reaction with the olefin reactant to form the ozonide free radical initiator can be obtained or formed in any convenient manner. For example, the ozone formed by passing oxygen through the silent discharges of ozonators is satisfactory for use in the present process.

The essential ozonide free radical initiator can be formed by passing ozone into the liquid alpha olefin raw material being prepared for hydrogen bromide addition. The temperature of the liquid olefin during the addition of the ozone can range from about 10° F. to about 160° F. without noticeable effect on the subsequent reaction with hydrogen bromide. The only criterion for the formation of the ozonide initiator appears to be provision for a certain non-critical minimum of contact between the alpha olefin and the ozone. It has been found that the reaction to form the ozonide proceeds rapidly and smoothly. Normally all of the gaseous ozone passed into the liquid alpha olefin promptly reacts with it. This finding is demonstrable in that overhead gases from ozonized air passed through an olefin do not give an oxidation test when bubbled through a potassium iodide solution.

Although the subsequent hydrobromination steps will proceed when amounts of ozone greater than that disclosed above are employed, for example 6 mole percent and higher, the net result is only to consume greater amounts of the starting alpha olefin raw material. Therefore, the least amount of ozonide formation that is necessary to catalyze the free radical addition should be used. Accordingly, it has been found that about 0.005 mole percent to about 5.0 mole percent of ozone when added to the olefin gives consistently good results in the practice of the present invention. It is preferred to use from about 0.01 mole percent to about 0.3 mole percent of ozone, especially when substantially pure alpha olefins are employed. It is to be appreciated that the olefin converted to ozonide is essentially lost to the desired alkyl monobromide reaction product emphasizing that the lowest possible mole percentages of ozonide should be formed as are sufficient to catalyze the hydrogen bromide addition reaction.

While the drawing and the preceding discussion illustrate the formation of an ozonide initiator in situ in the reaction stream, an excellent alternative method also is available. The ozonide initiator can be prepared by introducing the requisite amount of ozone into a stream of an alpha olefin raw material to form the ozonide and thereafter feeding the ozonide initiator into the bulk of olefin raw material to be hydrobrominated. The important consideration is that the ozonide initiator is essential to the free radical reaction. It is less important whether the ozonide is formed in situ in the entire amount of the alpha olefin raw material or whether it is preformed separately in a small amount of olefin and fed to the hydrobromination reaction zone. It is possible, moreover, to store the ozonides or olefins containing effective amounts of the ozonide initiator in metal containers for long periods without any apparent reduction in free radical activity.

The anti-Markownikoff addition reaction of hydrogen bromide to alpha olefins in the presence of an ozonide catalyst or initiator is rapidly effected in any reactor providing for good mass transfer between the gaseous hydrogen bromide phase and the liquid alpha olefin phase.

According to this invention, improved results are obtained by conducting the first phase of the reaction process, within a first or main dominant bath recycle system to a completeness level of from about 75% to 95% or preferably between 77% to 90% completeness level. This is accomplished by reacting the liquid alpha olefin raw material with from about 75 mole percent to about 95 mole percent of the stoichiometric amount of hydrogen bromide in the presence of a slight amount of an ozonide initiator. This means that from about 5 to about 25 mole percent of the olefin starting reactant remains unreacted in the first phase.

The temperature and the duration of the reaction in the first or main dominant bath recycle unit are closely interrelated since, generally, the higher the temperature is the shorter the reaction time needs to be. Typically, the temperature of the reaction in the first or main dominant bath recycle system is from about 20° F. to about 60° F., and preferably from about 25° F. to about 35° F., with an average residence time within the recycle system of from about 1 minute to about 15 minutes. Generally, an average residence time of from about 3 to about 10 minutes are required and, thus, this is the preferred duration. It should be understood, of course, that the sizing of the equipment used will necessarily determine the preceding process conditions.

The exothermic nature of the olefin-hydrogen bromide reaction is efficiently controlled by recycling a portion of the reaction solution after it has passed through the first heat exchanger 15. The recycled portion of the reaction solution is mixed in the primary reaction zone 14, with the alpha olefin raw material, the gaseous anhydrous hydrogen bromide and the ozonide initiator and functions as a heat sink by absorbing the heat of reaction. Generally speaking, the recycle rate of the reaction solution in zone A should be a minimum of about 20 times the rate of the initial feed (20:1). The upper limit can range as high as 100:1 but best results are obtained when the recycle rate is within about 40:1 to about 70:1. The important consideration is to insure control of the reaction temperature and prevent over-heating and decomposition of the alkyl bromide reaction product.

The partially converted reaction solution from the first hydrobromination step after passing through the heat exchanger and, containing from about 75 to about 95 mole percent alkyl bromide, from about 25 to about 5 mole percent unreacted alpha olefin and a small amount of the ozonide initiator is fed to a second reaction zone, 17, where additional gaseous anhydrous hydrogen bromide is added to complete the hydrogen bromide addition. The amount of hydrogen bromide which is added in this second step is dependent on the partial completeness level performed in the first hydrobromination reaction. In any event in a two-stage system, hydrogen bromide is added in an amount adequate to insure complete conversion of the alpha olefin to alkyl bromide. Usually an excess of hydrogen bromide is used, i.e. an excess of from about 15 mole percent to about 50 mole percent, to make certain that no unreacted alpha olefin remains.

The reaction conditions for the second hydrobromination reaction are essentially the same as in the first step, that is, the reaction temperature is between about 20° F. to about 60° F. and preferably between about 25° F. to about 35° F., and the average residence time within the dominant bath, Zone B, is from about 3 to about 15 minutes.

Because of the smaller quantities of reactants used in the second stage Zone B, the heat generated by the reaction is less of a problem than in the initial reaction step, and accordingly the recycle rate necessary to control the heat of reaction is proportionately less. Thus, a recycle rate of about 20:1 has been found adequate in the second dominant bath unit. It may range anywhere from about 10:1 to about 30:1.

The resulting alkyl bromide reaction product composed predominantly of primary alkyl bromides, small amounts of secondary bromides and a smaller amount of vinylidene branched-type monobrominated products is purged of excess hydrogen bromide in any suitable manner. For example, air, nitrogen, or helium, can be passed or bubbled through the reaction product. The resulting hydrogen bromide-free alkyl bromide reaction product thereafter can be neutralized with a weakly basic solution, for example, a 5 percent aqueous solution of sodium bicarbonate to form an upper organic phase and a lower aqueous phase. The upper organic phase containing the alkyl bromide is then separated and recovered.

Alternatively, the crude alkyl bromide reaction product is purged with a non-reactive gas as before and dissolved in about 1 to about 10 times its volume of a non-reactive solvent for alkyl bromide, such as chloroform or petroleum ether. The ethereal solution is then neutralized, as before with a weakly basic solution such as a 5 percent solution of sodium bicarbonate. The unneutralized ethereal solution can also be washed with water until neutral, and this procedure is followed in the case of more labile alkyl bromides. Regardless of the method used to neutralize the ethereal alkyl bromide solution, the neutralized solution is dried in any convenient manner, as by drying over magnesium sulfate. The solvent is removed from the dried ethereal alkyl bromide solution by evaporation or distillation under reduced pressure. In the case of the lower boiling alkyl bromides particularly, the solvent should be removed by careful distillation. The pure alkyl bromide reaction product is then distilled from the dried, solvent free, organic phase.

The reaction between gaseous anhydrous hydrogen bromide and olefins in the presence of their ozonides is rapidly effected in any reactor providing for good mass transfer between the gaseous hydrogen bromide phase and the liquid olefin phase. Under near ideal conditions of mass transfer, e.g., an agitated wetted wall column, the hydrogen bromide addition is completed within one minute. For a first order reaction, this time of completion corresponds to a reaction rate constant, K, of 5 min.$^{-1}$.

Favorable mass transfer conditions for the hydrogen bromide addition are obtained by bubbling the hydrogen bromide gas through the liquid olefin-olefin ozonide phase, using a porous plate gas distributor to insure small gas bubbles resulting in a large interphase area. Vigorous agitation of the liquid phase also increases mass transfer and aids in maintaining low reaction temperatures. Under favorable mass transfer conditions the rate of hydrogen bromide addition controls the reaction rate until a completeness of 80%–90% is reached. At this range of completeness, the unreacted olefin concentration becomes the dominant factor and the overall reaction rate is reduced.

Simple reactors fitted with means for introducing and distributing the hydrogen bromide, dominant bath reactors, wetted wall columns, and spray reactors are all useful in effectively carrying out the hydrogen bromide addition reaction.

The main side reaction competing with the desired "free radical" or anti-Markownikoff addition of hydrogen bromide is the "normal" or Markownikoff addition to form the less desirable less stable secondary alkyl bromides. Secondary alkyl bromide formation during hydrobromination is suppressed in the present invention by maintaining low reaction temperatures. For example, a product consisting of 97% primary bromide and 3% secondary bromide is attained when the present hydrobromination reaction is carried out at a temperature of about 50° F. or less with a total reaction time of about 10 ot about 20 minutes. If the reaction temperature is allowed to rise and be maintained at about 100° F. for the same total reaction period the alkyl bromide reaction product will contain about 11% secondary bromide. Such high levels of secondary alkyl bromides present very serious stability problems.

As mentioned above, rapid completion of the hydrogen bromide addition also tends to suppress the formation of secondary bromides. For example, when the hydrobromination of alpha olefins is conducted at about 50° F. and the addition is completed in about 5 minutes the alkyl bromide product will contain only about 2% of the secondary bromide. At the same reaction temperature, increasing the reaction time to about two hours by decreasing the rate of hydrogen bromide addition will increase the amount of secondary bromide in the alkyl bromide product as much as threefold, i.e., to about 6%.

The ozonide initiated "free radical" hydrobromination reaction is susceptible to poisoning by certain reducing agents. For example, hydrogen sulfide and sulfur dioxide quickly poison the ozonide catalyst and low bromination completeness accompanied by a shift toward "normal" alkyl bromide products results. The "free radical" hydrobromination reaction is highly sensitive also to the presence of certain materials of construction in the reaction equipment. Copper, for example, as a material of reactor construction or when exposed to the reactants in any manner has been found to result in unsatisfactory bromination completeness results. The presence of ferrous metals, namely stainless steel, also result in reducing reaction completeness by about 2% at atmospheric pressure. At increased pressures, reaction completeness in the presence of these metals dropped to levels as low as 85% with increased formation of secondary bromide products and product discoloration. Nickel, glass, glass-lined steel and polyvinyl chloride have been found to avoid, or minimize the foregoing deleterious effects and are the preferred materials for the fabrication of equipment for use in carrying out the present process.

It has been found that increasing the pressure above atmospheric increases the reaction rate. The completeness of a given hydrobromination reaction at a fixed time is increased by operating at pressures of about 20 p.s.i.g. to about 60 p.s.i.g. For example, one continuous hydrobromination reaction starting with ozone treated $C_{12}$-$C_{13}$ alpha olefin and using a reaction time of 8 minutes was conducted at atmospheric pressure in a dominant bath reactor system; a bromination completeness of 97.3% was obtained. The same hydrobromination reaction carried out at about 45 p.s.i.g. proceeded to a completeness of 98.8%.

The following examples further illustrate how this invention can be carried out in practice but the invention is not intended to be restricted thereby.

*Example I*

A mixture of alpha olefins, comprising 65% dodecene, 25% tetradecene and 10% hexadecene, of which 4% is vinylidene branched olefine, was fed continuously to the top of a packed column reactor at a rate of 100 lbs./hour. The olefin stream dropped by gravity through the packing. To the bottom of the column was metered a stream of oxygen, containing about 2% ozone, prepared by passing the oxygen through an ozone generating device, consisting of an electric discharge. The oxygen-ozone stream passed upward through the packed column, the ozone reacted essentially quantitatively with the olefin to form the ozonide; the oxygen-ozone stream was metered at such a rate to form approximately 0.2 mole percent ozonide in the olefin.

The olefin-ozonide mixture was pumped continuously to a two-stage dominant bath reactor. The first stage of the reactor consisted of a centrifugal pump, a heat exchanger and a loop of piping arranged so that the reaction mixture could be recycled through the loop. The olefin was admitted through a nozzle into the suction of the pump in order to obtain good mixing with the bulk of the recycle stream. Gaseous anhydrous hydrogen bromide was admitted through a nozzle into the pump, again to obtain good mixing, at a rate of approximately 37 lbs./hour. The reaction temperature was maintained between 30 and 27° F., as measured at the inlet and outlet of the heat exchanger, by cooling with a refrigerated brine solution. The pressure on the discharge of the pump was 76 p.s.i.g. The pressure dropped through the heat exchanger and was maintained at 25 p.s.i.g. at the pump suction by controlling the product take-off to the second stage; this was taken off at a point between the heat exchanger and the first stage recirculation pump. The ratio of recirculation stream to product take-off was maintained at about 60 to 1 to promote good heat and mass transfer.

The alkyl bromide olefin mixture from the first dominant bath stage was fed to the second stage at such a rate as to maintain the pressure in the first stage constant. The second stage was very similar to the first, but because of the lower heat removal requirements, the recycle rate and heat exchanger were smaller. The first stage effluent passed through a nozzle in the suction of the second stage pump to ensure good mixing with the recycle stream. Hydrogen bromide at a rate of approximately 20 lbs./hour was metered through a nozzle into the pump again to ensure good mixing. The excess hydrogen bromide, amounting to 27% excess, was used to ensure a complete conversion of olefin to alkyl bromide. Nearly all the excess hydrogen bromide dissolved in the product alkyl bromide, however a little escaped through a valve used to control the pressure in this second stage. The temperature of the recycle stream was maintained between 24° F. and 31° F. measured at the inlet and outlet of the heat exchanger. The pressure at the discharge of the pump was 64 p.s.i.g. and was maintained at 20 p.s.i.g. at the pump suction. A recycle ratio of 30 to 1 was maintained.

Conversion in the first stage was 82.6%, in the second stage 99.54%.

The second stage reactor product, containing the excess hydrogen bromide dissolved in the product, was contacted continuously with an aqueous sodium bromide solution to remove the hydrogen bromide. The solution strength was approximately 20% sodium bromide, and roughly equal volumes of alkyl bromide product and solution were used. The mixed phases were allowed to settle continuously in a tank. The alkyl bromide, being essentially free of hydrogen bromide, floated on the high density aqueous layer, making separation a fairly easy procedure.

A nitrile was prepared in the following manner: 14 grams of sodium cyanide (10% excess) was dissolved in 150 ml. of dimethyl sulfoxide, heated to 150° F. Seventy grams of the alkyl bromide resulting from the two stage process, dried by passing it through anhydrous sodium sulfate, was added to the reaction flask, the mixture was then agitated and heated to 275° F. for one hour. The resulting nitrile was water washed and dried. It was found to contain, on the original olefin basis, 3.36% olefin, i.e., only 2.90% had regenerated during the nitrilation. When an alkyl bromide product is used to prepare a nitrile that has been prepared by a usual single stage reaction rather than according to the present invention, as much as 7 to 10% olefin or more is regenerated, thus illustrating the improved stability of the alkyl bromides of this invention.

*Example II*

A mixture of alpha olefins, comprising 68% dodecene, 24% tetradecene and 8% hexadecene, of which 3% is vinylidene branched olefin, was fed continuously to the top of a packed column reactor at a rate of 100 lbs./hour. The olefin stream dropped by gravity through the packing. To the bottom of the column was metered a stream of oxygen, containing about 2% ozone, prepared by passing the oxygen through an ozone generating device, consisting of an electric discharge. The oxygen-ozone stream passed upward through the packed column, the ozone reacted essentially quantitatively with the olefin to form the ozonide; the oxygen-ozone stream was metered at such a rate to form approximately 0.2 mole percent ozonide in the olefin.

The olefin-ozonide mixture was pumped continuously to a two-stage dominant bath reactor. The first stage of the reactor consisted of a centrifugal pump, a heat exchanger and a loop of piping arranged so that the reaction mixture could be recycled through the loop. The olefin was admitted through a nozzle into the suction of the pump in order to obtain good mixing with the bulk of the recycle stream. Gaseous anhydrous hydrogen bromide was admitted through a nozzle into the pump, again to obtain good mixing, at a rate of approximately 35 lbs./hour. The reaction temperature was maintained between 25° F. and 20° F., as measured at the inlet and outlet of the heat exchanger, by cooling with a refrigerated brine solution. The pressure on the discharge of the pump was 76 p.s.i.g. The pressure dropped through the heat exchanger and was maintained at 24 p.s.i.g. at the pump suction by controlling the product take-off to the second stage; this was taken off at a point between the heat exchanger and the first stage recirculation pump. The ratio of recirculation stream to product take-off was maintained at about 60 to 1 to promote good heat and mass transfer.

The alkyl bromide olefin mixture from the first dominant bath stage was fed to the second stage at such a rate as to maintain the pressure in the first stage constant. The second stage was very similar to the first, but because of the lower heat removal requirements, the recycle rate and heat exchanger were smaller. The first stage effluent passed through a nozzle in the suction of the second stage pump to ensure good mixing with the recycle stream. Hydrogen bromide at a rate of approximately 20 lbs./hour was metered through a nozzle into the pump, again to ensure good mixing. Excess hydrogen bromide, amounting to 22% excess, was used to ensure a complete conversion of olefin to alkyl bromide. While nearly all the excess hydrogen bromide dissolved in the product alkyl bromide, a little escaped through a valve used to control the pressure in this second stage. The temperature of the recycle stream was maintained between 26° F. and 20° F. measured at the inlet and outlet of the heat exchanger. The pressure at the discharge of the pump was 53 p.s.i.g. and was maintained at 13 p.s.i.g. at the pump suction. A recycle ratio of 30 to 1 was maintained.

Conversion in the first stage was 77.6%, in the second stage 99.5%.

The second stage reactor product, containing the excess hydrogen bromide dissolved in the product, was contacted continuously with an aqueous sodium bromide solution to remove the hydrogen bromide. The solution strength was approximately 20% sodium bromide, and roughly equal volumes of alkyl bromide product and solution were used. The mixed phases were allowed to settle continuously in a tank, the alkyl bromide, essentially free of hydrogen bromide, floating on the high density aqueous layer.

The stability of this alkyl bromide reaction product was determined by running a nitrilation reaction.

A nitrile was prepared in the following manner: 14 grams of sodium cyanide (10% excess) was dissolved in 150 ml. of dimethyl sulfoxide, heated to 150° F. Seventy grams of the alkyl bromide resulting from Example II, dried by passing it through anhydrous sodium sulfate, was added to the reaction flask, the mixture was then agitated and heated to 275° F. for one hour. The resulting nitrile was water washed and dried. It was found to contain, on the original olefin basis, 2.94% olefin, i.e., only 2.44% had regenerated during the nitrilation.

*Example II*

A mixture of alpha olefins, comprising 68% dodecene, 24% tetradecene and 8% hexadecene, of which 3% is vinylidene branched olefin, was fed continuously to the top of a packed column reactor at a rate of 100 lbs./hour. The olefin stream dropped by gravity through the packing. To the bottom of the column was metered a stream of oxygen, containing about 2% ozone, prepared by passing the oxygen through an ozone generating device, consisting of an electric discharge. The oxygen-ozone stream passed upward through the packed column, the ozone reacted essentially quantitatively with the olefin to form the ozonide; the oxygen-ozone stream was metered at such a rate to form approximately 0.2 mole percent ozonide in the olefin.

The olefin-ozonide mixture was pumped continuously to a two-stage dominant bath reactor. The first stage of the reactor consisted of a centrifugal pump, a heat exchanger and a loop of piping arranged so that the reaction mixture could be recycled through the loop. The olefin was admitted through a nozzle into the suction of the pump in order to obtain good mixing with the bulk of the recycle stream. Gaseous anhydrous hydrogen bromide was admitted through a nozzle into the pump, again to obtain good mixing, at a rate of approximately 37 lbs./hour. The reaction temperature was maintained between 25° F. and 20° F., as measured at the inlet and outlet of the heat exchanger, by cooling with a refrigerated brine solution. The pressure on the discharge of the pump was 76 p.s.i.g. The pressure dropped through the heat exchanger and was maintained at 24 p.s.i.g. at the pump suction by controlling the product take-off to the second stage; this was taken off at a point between the heat exchanger and the first stage recirculation pump. The ratio of recirculation stream to product take-off was maintained at about 60 to 1 to promote good heat and mass transfer.

The alkyl bromide olefin mixture from the first dominant bath stage was fed to the second stage at such a rate as to maintain the pressure in the first stage constant. The second stage was very similar to the first, but because of the lower heat removal requirements, the recycle rate and heat exchanger were smaller. The first stage effluent passed through a nozzle in the suction of the second stage pump to ensure good mixing with the recycle stream. Hydrogen bromide at a rate of approximately 20 lbs./hour was metered through a nozzle into the pump, again to ensure good mixing. Excess hydrogen bromide, amounting to 27% excess, was used to ensure a complete conversion of olefin to alkyl bromide. While nearly all the excess hydrogen bromide dissolved in the product alkyl bromide, a little escaped through a valve used to control the pressure in this second stage. The temperature of the recycle stream was maintained between 26° F. and 21° F., measured at the inlet and outlet of the heat exchanger. The pressure at the discharge of the pump was 54 p.s.i.g. and was maintained at 10 p.s.i.g. at the pump suction. A recycle ratio of 30 to 1 was maintained.

Conversion in the first stage was 83.1%, in the second stage 99.5%.

The second stage reactor product, containing the excess hydrogen bromide dissolved in the product, was contacted continuously with an aqueous sodium bromide solution to remove the hydrogen bromide. The solution strength was approximately 20% sodium bromide, and roughly equal volumes of alkyl bromide product and solution were used. The mixed phases were allowed to settle continuously in a tank, the alkyl bromide, essentially free of hydrogen bromide, floating on the high density aqueous layer.

Again stability of the reaction product was evaluated as in Examples I and II.

A nitrile was prepared in the following manner: 14 grams of sodium cyanide (10% excess) was dissolved in 150 ml. of dimethyl sulfoxide, heated to 150° F. Seventy grams of the alkyl bromide resulting from the two stage process, dried by passing it through anhydrous sodium sulfate, was added to the reaction flask, the mixture was then agitated and heated to 275° F. for one hour. The resulting nitrile was water washed and dried. It was found to contain, on the original olefin bases, 3.03% olefin, i.e., 2.55% had regenerated during the nitrilation.

*Example IV*

A mixture of alpha olefins, comprising 67% dodecene, 23% tetradecene and 10% hexadecene, of which 3.5% is vinylidene branched olefin, was fed continuously to the top of a packed column reactor at a rate of 100 lbs./hour. The olefin stream dropped by gravity through the packing. To the bottom of the column was metered a stream of oxygen, containing about 2% ozone, prepared by passing the oxygen through an ozone generating device, consisting of an electric discharge. The oxygen-ozone stream passed upward through the packed column, the ozone reacted essentially quantitatively with the olefin to form the ozonide; the oxygen-ozone stream was metered at such a rate to form approximately 0.2 mole percent ozonide in the olefin.

The olefin-ozonide mixture was pumped continuously to a two-stage dominant bath reactor. The first stage of the reactor consisted of a centrifugal pump, a heat exchanger and a loop of piping arranged so that the reaction mixture could be recycled through the loop. The olefin was admitted through a nozzle into the suction of the pump in order to obtain good mixing with the bulk of the recycle stream. Gaseous anhydrous hydrogen bromide was admitted through a nozzle into the pump, again to obtain good mixing, at a rate of approximately 37 lbs./hour. The reaction temperature was maintained between 30° F. and 26° F., as measured at the inlet and outlet of the heat exchanger, by cooling with a refrigerated brine solution. The pressure on the discharge of the pump was 76 p.s.i.g. The pressure dropped through the heat exchanger and was maintained at 25 p.s.i.g. at the pump suction by controlling the product take-off to the second stage; this was taken off at a point between the heat exchanger and the first stage recirculation pump. The ratio of recirculation stream to product take-off was maintained at about 60 to 1 to promote good heat and mass transfer.

The alkyl bromide olefin mixture from the first dominant bath stage was fed to the second stage at such a rate as to maintain the pressure in the first stage constant. The second stage was very similar to the first, but because of the lower heat removal requirements, the recycle rate and heat exchanger were smaller. The first stage effluent passed through a nozzle in the suction of the second stage pump to ensure good mixing with the recycle stream. Hydrogen bromide at a rate of approximately 20 lbs./hour was metered through a nozzle into the pump, again to ensure good mixing. The excess hydrogen bromide, amounting to 27% excess, was used to ensure a complete conversion of olefin to alkyl bromide. While nearly all the excess hydrogen bromide dissolved in the product alkyl bromide, a little escaped through a valve used to control the pressure in this second stage. The temperature of the recycle stream was maintained between 34° F. and 28° F., measured at the inlet and outlet of the heat exchanger. The pressure at the discharge of the pump was 54 p.s.i.g. and was maintained at 19 p.s.i.g. at the pump suction. A recycle ratio of 30 to 1 was maintained.

Conversion in the first stage was 82.7%, in the second stage 99.3%.

The second stage reactor product, containing the excess hydrogen bromide dissolved in the product, was contacted continuously with an aqueous sodium bromide solution to remove the hydrogen bromide. The solution strength was approximately 20% sodium bromide, and roughly equal volumes of alkyl bromide product and solution were used. The mixed phases were allowed to settle continuously in a tank. The alkyl bromide, being essentially free of hydrogen bromide, floated on the high density aqueous layer, making separation a fairly easy procedure.

The stability evaluation comprised a nitrilation reaction.

A nitrile was prepared in the following manner: 14 grams of sodium cyanide (10% excess) was dissolved in 150 ml. of dimethyl sulfoxide, heated to 150° F. Seventy grams of the alkyl bromide resulting from the two stage process, dried by passing it through anhydrous sodium sulfate, was added to the reaction flask, the mixture was then agitated and heated to 275° F. for one hour. The resulting nitrile was water washed and dried. It was found to contain, on the original solefin basis, 3.55% olefin, i.e., 2.83% had regenerated during the nitrilation.

The following experiments illustrate the inferior results which are obtained when a hydrobromination reaction is run outside the ranges specified above as being essential. Experiment A, for instance, is a single stage hydrobromination process and the poor results obtained are apparent. Similarly, Experiments B, C, and D illustrate what happens in a two stage hydrobromination reaction where the first stage conversion percentage exceeds about 95%. For all practical purposes, the following experiments establish that a usual single stage hydrobromination process produces unstable alkyl bromides as evidenced by a high amount of olefin regeneration during nitrilation and also that equally poor stability results are obtained by running a two stage reaction wherein the conversion percentage to alkyl bromide exceeds about 95% in the first stage.

*Experiment A*

A mixture of alpha olefins, comprising 50% dodecene, 40% tertadecene and 10% hexadecene, of which 3.6% is vinylidene branched olefin, was fed continuously to the top of a packed column reactor at a rate of 50 lbs./hour. The olefin stream dropped by gravity through the packing. To the bottom of the column was metered a stream of oxygen, containing about 2% ozone, prepared by passing the oxygen through an ozone generating device, consisting of an electric discharge. The oxygen-ozone stream passed upward through the packed column, the ozone reacted essentially quantitatively with the alpha olefin to form the corresponding ozonide; the oxygen-ozone stream was metered at such a rate to form approximately 0.2 mole percent ozonide in the olefin.

The olefin-ozonide mixture was pumped continuously to a single stage reactor whereas Examples I through IV all employed two stage reactor systems. The single stage reactor consisted of a centrifugal pump, a heat exchanger and a loop of piping arranged so that the reaction mixture could be recycled through the loop. The olefin was admitted through a nozzle into the suction of the pump in order to obtain good mixing with the bulk of the recycle stream. Gaseous anhydrous hydrogen bromide was admitted through a nozzle into the pump, again to obtain good mixing, at a rate of approximately 22 lbs./hour. The reaction temperature was maintained approximately between 30° F. and 20° F. as measured at the inlet and outlet of the heat exchanger by cooling with a refrigerated brine solution. The pressure on the discharge of the pump was 62 p.s.i.g., the pressure dropped through the heat exchanger and was maintained at approximately 15 p.s.i.g. at the pump suction by controlling the product take-off. The ratio of recirculation stream to product take-off was maintained at about 150 to 1 to promote good heat and mass transfer. Conversion to alkyl bromide was 99.6 mole percent.

The reaction product was contacted continuously with an aqueous sodium bromide solution in a manner similar to that of the preceding example to remove the unreacted hydrogen bromide.

A nitrile prepared in similar fashion to that of Example I was found to contain, on the original olefin basis, 5.85% olefin, i.e., 5.43% of the original olefin had regenerated during the nitrilation. The large percentage of regenerated olefin represents an increase of greater than 100% over the average amount of olefin regenerated in Examples I through IV. It is desirable, of course, to hold the amount of regenerated olefin to an absolute minimum.

*Experiment B*

A mixture of alpha olefins, comprising 38% dodecene, 37% tetradecene and 25% hexadecene, of which 3.4% is vinylidene branched olefin, was fed continuously to the top of a packed column reactor at a rate of 50 lbs./hour. The olefin stream dropped by gravity through the packing. To the bottom of the column was metered a stream of oxygen, containing about 2% ozone, prepared by passing the oxygen through an ozone generating device, consisting of an electric discharge. The oxygen-ozone stream passed upward through the packed column, the ozone reacted essentially quantitatively with the olefin to form the corresponding ozonide. The oxygen-ozone stream was metered at such a rate to form approximately 0.2 mol percent ozonide in the olefin.

The olefin-ozonide mixture was pumped continuously to a two-stage dominant bath reactor. The first stage of the reactor consisted of a centrifugal pump, a heat exchanger and a loop of piping arranged so that the reaction mixture could be recycled through the loop. The olefin was admitted through a nozzle into the suction of the pump in order to obtain good mixing with the bulk of the recycle stream. Gaseous anhydrous hydrogen bromide was admitted through a nozzle into the pump again to obtain good mixing, at a rate of approximately 22 lbs./hour. The reaction temperature was maintained between 30° F. and 27° F., as measured at the inlet and outlet of the heat exchanger, by cooling with a refrigerated brine solution. The pressure dropped through the heat exchanger and was maintained at 19 p.s.i.g. at the pump suction by controlling the product take-off to the second stage; this was taken off at a point between the heat exchanger and the first stage recirculation pump. The ratio of recirculation stream to product take-off was maintained at about 160 to 1 to promote good heat and mass transfer.

The alkyl bromide olefin reaction mixture from the first dominant bath stage was fed to the second stage at such a rate as to maintain the pressure in the first stage constant. The second stage was similar to the first, but because of the lower heat removal requirements, the recycle rate and heat exchanger were smaller. The first stage effluent passed through a nozzle in the suction of the second stage pump to ensure good mixing with the recycle stream. Hydrogen bromide at a rate of approximately 11 lbs./hour was metered through a nozzle into the pump again to ensure good mixing. Excess hydrogen bromide, amounting to 45% excess, was used to ensure a complete conversion of olefin to alkyl bromide. While nearly all of the excess hydrogen bromide dissolved in the product alkyl bromide, a little escaped through a valve used to control the pressure in this second stage. The temperature of the recycle stream was maintained between 24° F. and 25° F. measured at the inlet and outlet of the heat exchanger. The pressure at the discharge of the pump was 47 p.s.i.g. and was maintained at 14 p.s.i.g. at the pump suction. A recycle ratio of 60 to 1 was maintained.

Conversion in the first stage was 99.22%, in the second stage 99.25%.

The second stage reactor product, containing the excess hydrogen bromide dissolved in the product, was contacted continuously with an aqueous sodium bromide solution to remove the hydrogen bromide. The solution strength was approximately 20% sodium bromide, and roughly equal volumes of alkyl bromide product and solution were used. The mixed phases were allowed to settle continuously in a tank. The alkyl bromide, being essentially free of hydrogen bromide, floated on the high density aqueous layer facilitating separation.

A nitrile was prepared in the following manner to test stability of the reaction product: 14 grams of sodium cyanide (10% excess) was dissolved in 150 ml. of dimethyl sulfoxide, heated to 150° F. Seventy grams of the alkyl bromide resulting from the two stage process, dried by passing it through anhydrous sodium sulfate, was added to the reaction flask, the mixture was then agitated and heated to 275° F. for one hour. The resulting nitrile was water washed and dried. It was found to contain, on the original olefin basis, 6.27% olefin, i.e., 5.52% had regenerated during the nitrilation. This measure of instability is in marked contrast to the more stable products of Examples I through IV as evidenced by the average amount of regenerated olefin in these examples of only 2.68%.

The alkyl bromide resulting from the two stage process of this example was also aminated with dimethylamine in a continuous tubular reactor arranged so that heat may be transferred to the reaction mass. The alkyl bromide reaction product was fed at 100 lbs./hour, and liquid dimethylamine was fed at 180 lbs./hour, while heat was applied to the reactor so that the temperature rose from 70° F. to 300° F. in a length of reactor corresponding to about 2.5 minutes. The temperature was maintained at 300° F. over the remaining length of reactor, equivalent to an additional 9.5 minutes. The pressure in the reactor was maintained at 1000 p.s.i.g. by throttling the effluent from the reactor through a valve. Sodium hydroxide was added to the effluent in slight excess to convert any dimethylamine hydrobromide, formed by the liberated hydrogen bromide being neutralized by dimethylamine, to sodium bromide. The entire reaction mass was fed continuously to a stripping column in order to remove the excess dimethylamine as a vapor from the top of the column; the alkyl amine, water and sodium bromide were taken out the bottom of the column and fed continuously to a tank where the aqueous and organic phases separated. The alkyl amine was evaporated continuously under vacuum in order to remove color bodies and other nonvolatile impurities. When the dimethylamine product was analyzed, it was found to contain, on the original olefin basis, 3.79 mole percent olefin, i.e., 3.04% of the original olefin had regenerated to olefin.

*Experiment C*

A mixture of alpha olefins, comprising 65% dodecene, 24% tetradecene and 11% hexadecene, of which 1.8% is vinylidene branched olefin, was fed continuously to the top of a packed column reactor at a rate of 75 lbs./hour. The olefin stream dropped by gravity through the packing. To the bottom of the column was metered a stream of oxygen, containing about 2% ozone, prepared by passing the oxygen through an ozone generating device, consisting of an electric discharge. The oxygen-ozone stream passed upward through the packed column, the ozone reacted essentially quantitatively with the olefin to form the ozonide; the oxygen-ozone stream was metered at such a rate to form approximately 0.2 mole percent ozonide in the olefin.

The olefin-ozonide mixture was pumped continuously to a two-stage dominant bath reactor. The first stage of the reactor consisted of a centrifugal pump, a heat exchanger and a loop of piping arranged so that the reaction mixture could be recycled through the loop. The olefin was admitted through a nozzle into the suction of the pump in order to obtain good mixing with the bulk of the recycle stream. Gaseous anhydrous bromide was admitted through a nozzle into the pump, again to obtain good mixing, at a rate of approximately 33 lbs./hour. The reaction temperature was maintained between 30° F. and 27° F., as measured at the inlet and outlet of the heat exchanger, by cooling with a refrigerated brine solution. The pressure on the discharge of the pump was 80 p.s.i.g., the pressure dropped through the heat exchanger and was maintained at 30 p.s.i.g. at the pump suction by controlling the product take-off to the second stage; this was taken off at a point between the heat exchanger and the first step recirculation pump. The ratio of recirculation stream to product take-off was maintained at about 80 to 1 to promote good heat and mass transfer.

The alkyl bromide olefin reaction mixture from the first dominant bath stage was fed to the second stage at such a rate as to maintain the pressure in the first stage constant. The second stage was similar to the first, but because of the lower heat removal requirements, the recycle rate and heat exchanger were smaller. The first stage effluent passed through a nozzle in the suction of the second stage pump to ensure good mixing with the recycle stream. Hydrogen bromide at a rate of approximately 15 lbs./hour was metered through a nozzle into the pump, again to ensure good mixing. Excess hydrogen bromide, amounting to 40% excess, was used to ensure a complete conversion of olefin to alkyl bromide. While nearly all of the excess hydrogen bromide dissolved in the product alkyl bromide, a little escaped through a valve used to control the pressure in this second stage. The temperature of the recycle stream was maintained between 30° F. and 27° F., measured at the inlet and outlet of the heat exchanger. The pressure at the discharge of the pump was 80 p.s.i.g. and was maintained at 30 p.s.i.g. at the pump suction. A recycle ratio of 45 to 1 was maintained.

Conversion in the first stage was 98.3%, in the second stage 99.2%.

The second stage reactor product, containing the excess hydrogen bromide dissolved in the product, was contacted continuously with an aqueous sodium bromide solution to remove the hydrogen bromide. The solution strength was approximately 20% sodium bromide, and roughly equal volumes of alkyl bromide product and solution were used. The mixed phases were allowed to settle continuously in a tank. The alkyl bromide, being essentially free of hydrogen bromide, floated on the high density aqueous layer facilitating separation.

A nitrile was prepared in the following manner: 14 grams of sodium cyanide (10% excess) was dissolved in 150 ml. of dimethyl sulfoxide, heated to 150° F. Seventy grams of the alkyl bromide resulting from the two stage process, dried by passing it through anhydrous sodium sulfate, was added to the reaction flask, the mixture was then agitated and heated to 275° F. for one hour. The resulting nitrile was water washed and dried. In contrast to the excellent low olefin regeneration levels obtained according to this invention in Examples I through IV, the reaction product of this experiment was found to contain, on the original olefin basis, 7.07% olefin, i.e., 6.23% had regenerated during the nitrilation.

*Experiment D*

A mixture of alpha olefins, comprising 65% dodecene, 25% tetradecene and 10% hexadecene, of which 2.5% is vinylidene branched olefin, was fed continuously to the top of a packed column reactor at a rate of 50 lbs./hour. The olefin stream dropped by gravity through the packing. To the bottom of the column was metered a stream of oxygen, containing about 2% ozone, prepared by passing the oxygen through an ozone generating device, consisting of an electric discharge. The oxygen-ozone stream passed upward through the packed column, the ozone reacted essentially quantitatively with the olefin to form the ozonide; the oxygen-ozone stream was metered at such a rate to form approximately 0.2 mole percent ozonide in the olefin.

The olefin ozonide mixture was pumped continuously to a two-stage dominant bath reactor. The first stage of the reactor consisted of a centrifugal pump, a heat exchanger and a loop of piping arranged so that the reaction mixture could be recycled through the loop. The olefin was admitted through a nozzle into the suction of the pump in order to obtain good mixing with the bulk of the recycle stream. Gaseous anhydrous hydrogen bromide was admitted through a nozzle into the pump, again to obtain good mixing, at a rate of approximately 22 lb./hour. The reaction temperature was maintained between 24° F. and 22° F., as measured at the inlet and outlet of the heat exchanger, by cooling with a refrigerated brine solution. The pressure on the discharge of the pump was 78 p.s.i.g., the pressure dropped through the heat exchanger and was maintained at 30 p.s.i.g. at the pump suction by controlling the product take-off to the second stage; this was taken off at a point between the heat exchanger and the first stage recirculation pump. The ratio of recirculation stream to product take-off was maintained at about 120 to 1 to promote good heat and mass transfer.

The alkyl bromide olefin reaction mixture from the first dominant bath stage was fed to the second stage at such a rate as to maintain the pressure in the first stage constant. The second stage was similar to the first, but because of the lower heat removal requirements, the recycle rate and heat exchanger were smaller. The first stage effluent passed through a nozzle in the suction of the second stage pump to ensure good mixing with the recycle stream. Hydrogen bromide at a rate of approximately 15 lbs./hour was metered through a nozzle into the pump, again to ensure good mixing. Excess hydrogen bromide, amounting to 65% excess, was used to ensure a complete conversion of olefin to alkyl bromide. While nearly all of the excess hydrogen bromide dissolved in the product alkyl bromide, a little escaped through a valve used to control the pressure in this second stage. The temperature of the recycle stream was maintained between 24° F. and 22° F., measured at the inlet and outlet of the heat exchanger. The pressure at the discharge of the pump was 60 p.s.i.g. and was maintained at 16 p.s.i.g. at the pump suction. A recycle ratio of 60 to 1 was maintained.

Conversion in the first stage was 98.0%, in the second stage 99.1%.

The second stage reactor product, containing the excess hydrogen bromide dissolved in the product, was contacted continuously with an aqueous sodium bromide solution to remove the hydrogen bromide. The solution strength was approximately 20% sodium bromide, and roughly equal volumes of alkyl bromide product and solution were used. The mixed phases were allowed to settle continuously in a tank. The alkyl bromide, being essentially free of hydrogen bromide, floated on the high density aqueous layer facilitating separation.

Stability of this reaction product was determined by preparing a nitrile in the following manner: 14 grams of sodium cyanide (10% excess) was dissolved in 150 ml. of dimethyl sulfoxide, heated to 150° F. Seventy grams of the alkyl bromide resulting from the two-stage process, dried by passing it through anhydrous sodium sulfate, was added to the reaction flask, the mixture was then agitated and heated to 275° F. for one hour. The resulting nitrile was water washed and dried. It was found to contain, on the original olefin basis, 5.60% olefin, i.e., 4.70% had regenerated during the nitrilation. This figure should be compared to Examples I to IV when an average of only 2.68% was regenerated.

The main advantage of the present multi-stage hydrobromination process, namely the stability of the alkyl bromide reaction product, is clearly evidenced by comparison of the preceding experimental work. In Examples I through IV, the percentages of regenerated olefin during nitrilation averages out to 2.68%. This excellent stability characteristic makes possible substantial improvements in the many organic reactions which involve primary alkyl bromides. For instance, the savings in cost is apparent since less alkyl bromide raw material can be used. Greater flexibility in processing conditions, such as temperature, is obtained.

As mentioned previously, Experiments A through D, show that when the critical aspects of the present invention are not followed or if the present invention is otherwise materially altered, primary alkyl bromide reaction products are obtained that are of inferior quality.

While this invention has been described with respect to certain embodiments, it is not so limited, and it is to be understood that variations and modifications thereof obvious to those skilled in the art may be made without departing from the spirit or scope of this invention.

What is claimed is:

1. A continuous process for preparing an alkyl bromide reaction product of improved stability by the free radical addition of hydrogen bromide to alpha olefins having from about 10 to about 20 carbon atoms and including from about 1 to about 10 percent of vinylidene branched olefins comprising the steps of:
    (a) reacting in a first reaction zone said alpha olefins with from about 75 mole percent to about 95 mole percent of the stoichiometric amount of gaseous anhydrous hydrogen bromide in the presence of from about 0.005 mole percent to about 5.0 mole percent of an ozonide of an alpha olefin as a free radical initiator to cause partial conversion of the olefins to alkyl bromides to a completeness level of from about 75% to 95%, and,
    (b) reacting in a subsequent reaction zone said partially converted reaction product with additional excess gaseous anhydrous hydrogen bromide to complete the conversion reaction, each of the reaction steps being carried on within a temperature range of from about 20° F. to about 60° F. and for a period of from about 1 to about 15 minutes.

2. The process of claim 1 wherein said ozonide free radical initiator is present in amounts of from about 0.01 mole percent to about 0.3 mole percent.

3. The process of claim 1 wherein the alpha olefin raw material is pretreated with ozone to form in situ a corresponding aliphatic ozonide free radical initiator prior to the reaction with the gaseous anhydrous hydrogen bromide.

4. The process of claim 3 wherein the pretreatment with ozone comprises passing ozone into a solution of said alpha olefins in an amount of from about .005 to about 5.0 mole percent.

5. The process of claim 1 wherein said partial conversion is on a level of from about 77% to about 90% completeness.

6. The process of claim 1 wherein each of the reaction steps is carried on within a temperature range of from about 25° F. to about 35° F. and for a period of about 3 to about 10 minutes.

7. A continuous process for preparing an alkyl bromide reaction product of improved stability by the free radical addition of hydrogen bromide to alpha olefins having from about 10 to about 20 carbon atoms and including from about 1% to about 10% of vinylidene branched olefins, said process employing a plurality of reaction zones and comprising the steps of:
    introducing into a first reaction zone an alpha olefin raw material containing from about 0.005 to about 5.0 mole percent of an ozonide of an alpha olefin as a free radical initiator and from about 75 to about 95 mole percent of gaseous anhydrous hydrogen bromide based on the weight of the alpha olefin;
    reacting said alpha olefin and said hydrogen bromide with vigorous mixing for an average residence time within said first reaction zone of from about 1 to about 15 minutes whereby from about 75% to about 95% of the alpha olefin is converted to alkyl bromide, the temperature of the reaction being in a range of from about 20° F. to about 60° F.;
    continuously withdrawing a stream of partially-converted reaction product from said first reaction zone and passing it through a heat exchanger, splitting said withdrawn stream of partially converted reaction product into two fractions;
    recycling one fraction to said first reaction zone at a rate of from about 20:1 to about 100:1 of the initial feed to said zone;
    passing the second fraction to a second reaction zone;
    introducing into said second reaction zone, an additional amount of gaseous anhydrous hydrogen bromide which is adequate to complete the conversion of the alpha olefin to alkyl bromide;
    the residence time of said partially converted alkyl bromide reaction product in said second reaction zone being from about 3 minutes to about 15 minutes, the reaction temperature being in the range of from about 20° F. to about 60° F.;
    continuously withdrawing a stream of completely converted alkyl bromide reaction product from said second reaction zone and passing it through a heat exchanger;
    splitting said withdrawn stream into two fractions;
    recycling one fraction to said second reaction zone at a rate of from about 10 to about 30 times the rate of introduction of the partially converted reaction product from the first reaction zone;
    and recovering the second fraction of said completely converted alkyl bromide reaction product.

8. The process of claim 7 wherein the alpha olefin raw material contains from about .01 mole percent to about 0.3 mole percent of said ozonide free radical initiator.

References Cited

UNITED STATES PATENTS

| | | | |
|---|---|---|---|
| 2,058,465 | 10/1936 | Kharasch | 260—663 |
| 2,329,795 | 9/1943 | Stanley et al. | 260—656 |
| 2,818,447 | 12/1957 | Neher | 260—663 |
| 3,108,141 | 10/1963 | Gasson et al. | 260—663 |

FOREIGN PATENTS

| | | |
|---|---|---|
| 1,051,265 | 2/1959 | Germany. |
| 1,088,030 | 9/1960 | Germany. |
| 843,234 | 8/1960 | Great Britain. |
| 892,329 | 3/1962 | Great Britain. |
| 927,114 | 5/1963 | Great Britain. |

OTHER REFERENCES

Mayo et al.: "Chem. Reviews," vol. 27 (1940) pp. 366–369, 388–394.

Walling et al.: "J. Amer. Chem. Soc.," vol. 61 (1939), pp. 2693–6.

LEON ZITVER, *Primary Examiner.*

BERNARD HELFIN, *Examiner.*

K. V. ROCKEY, T. DILLAHUNTY,
        *Assistant Examiners.*